UNITED STATES PATENT OFFICE.

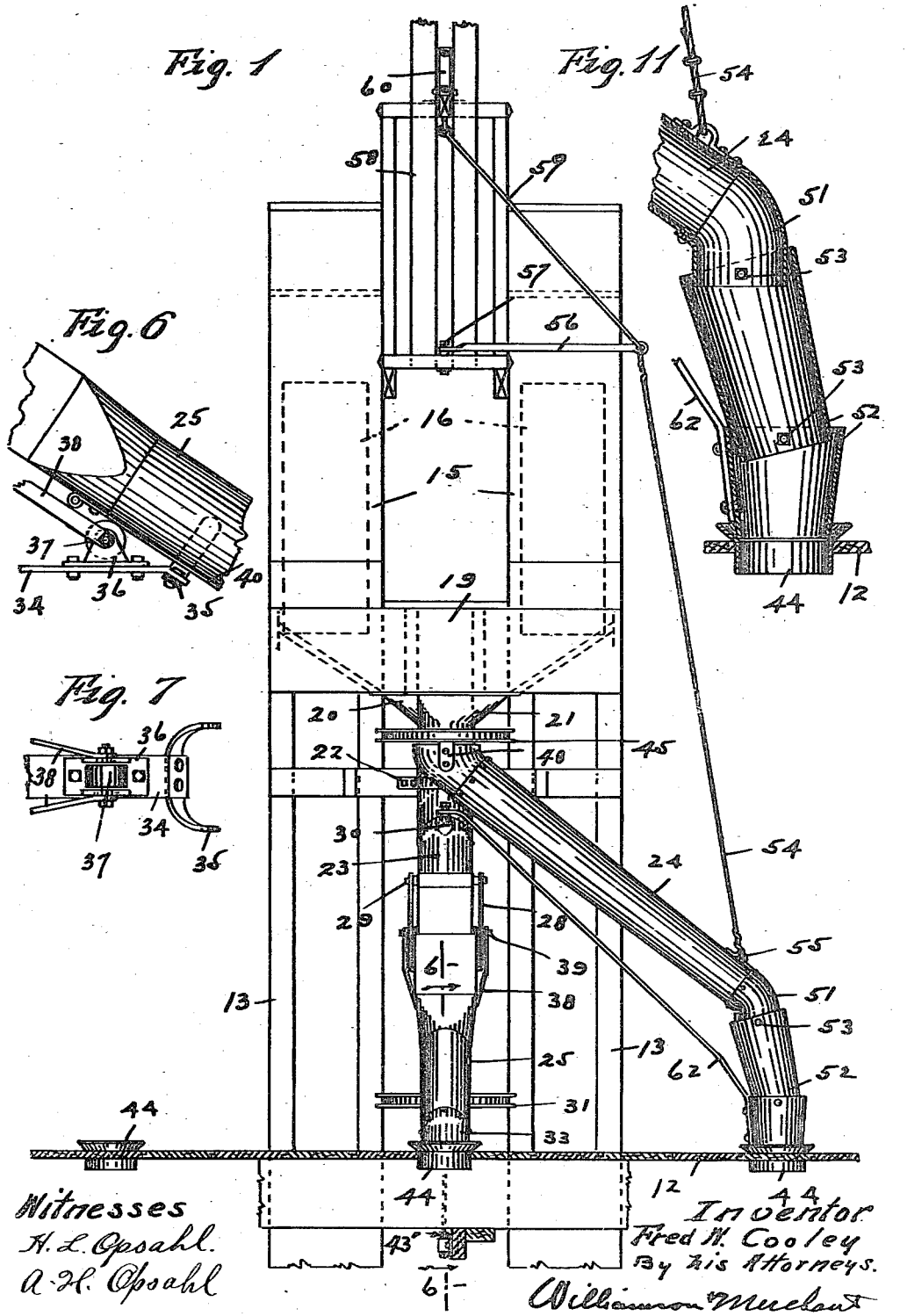

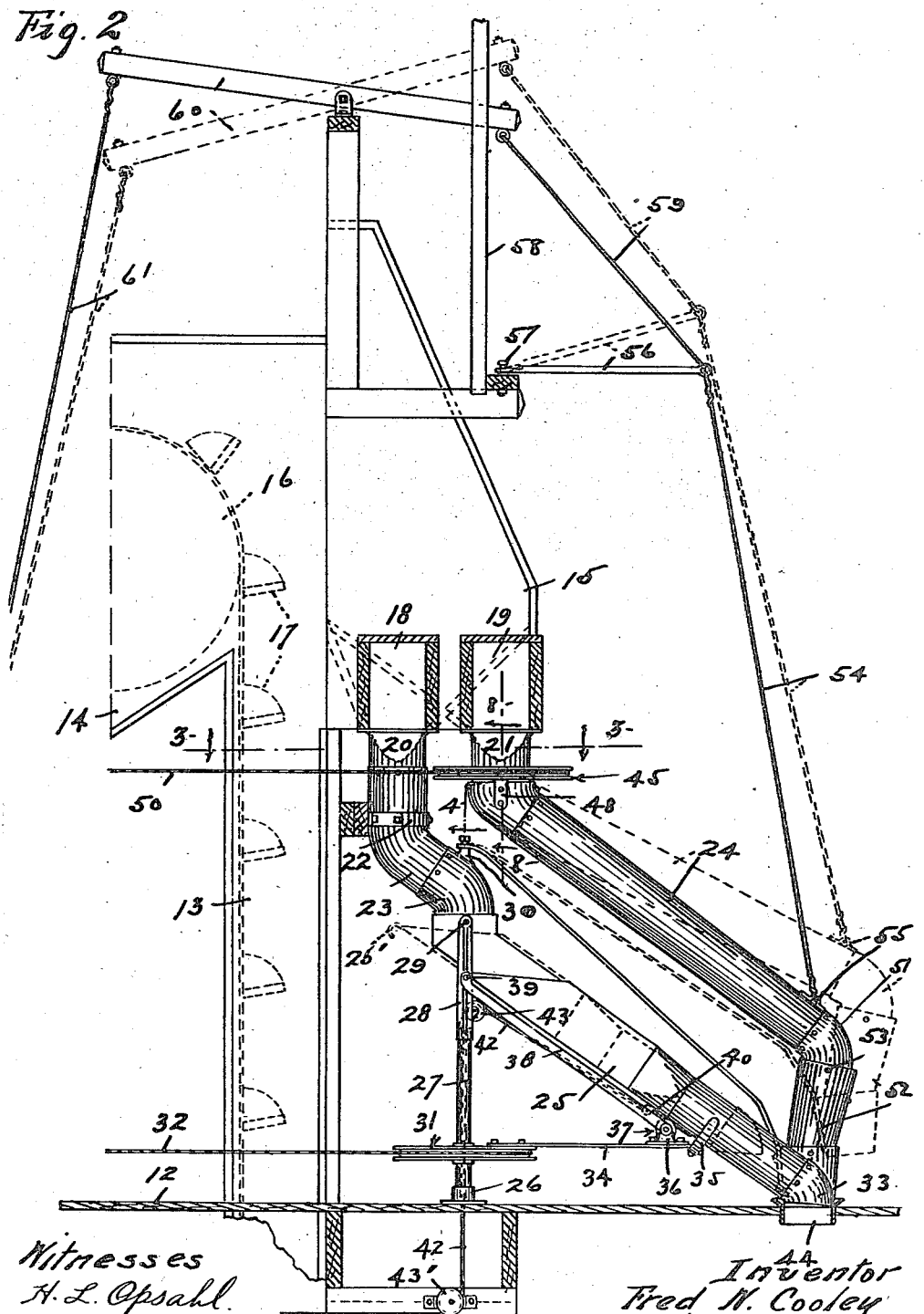

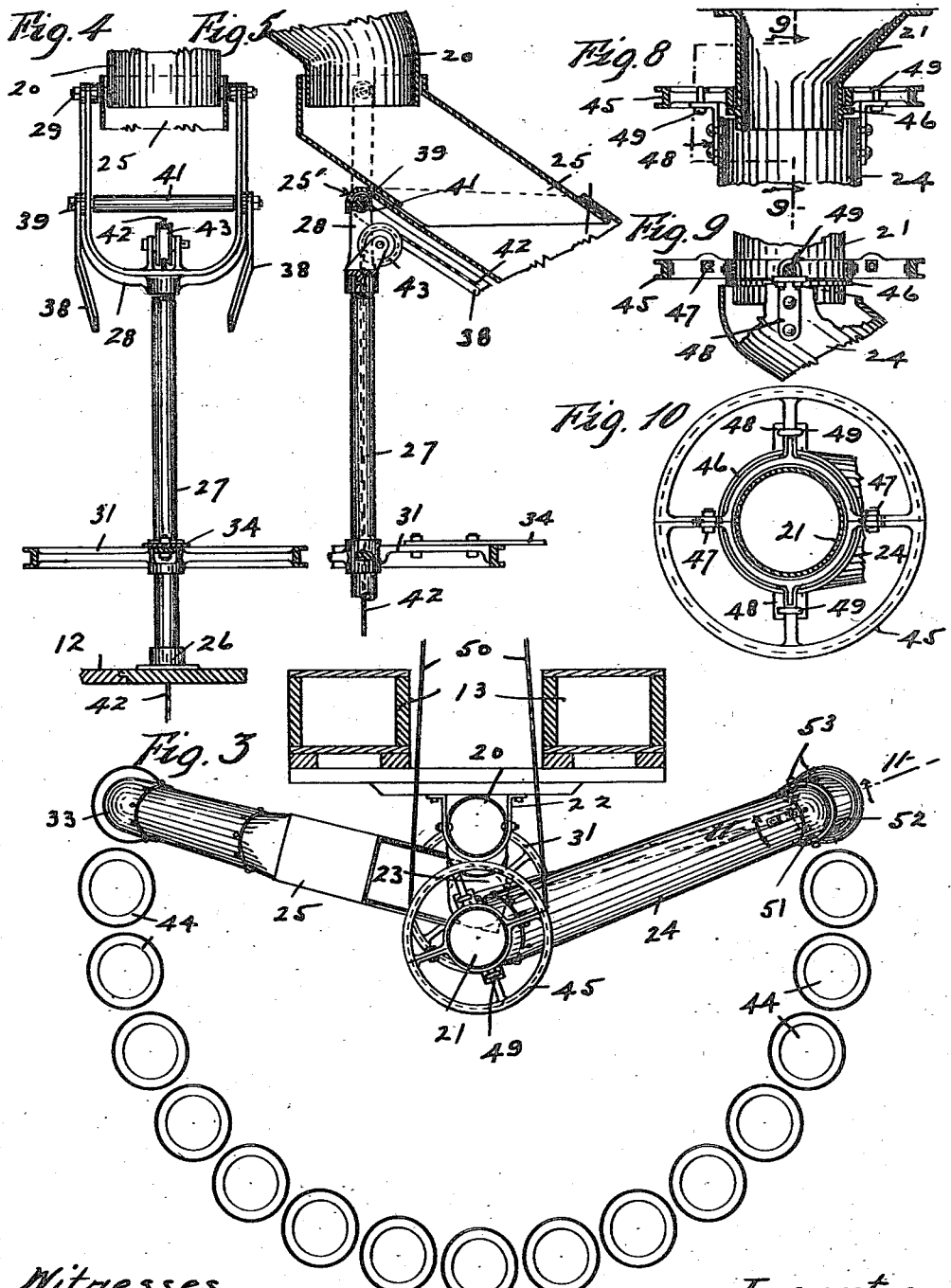

FRED W. COOLEY, OF MINNEAPOLIS, MINNESOTA, ASSIGNOR TO JAMES J. GERBER, OF MINNEAPOLIS, MINNESOTA.

DISTRIBUTING-SPOUT.

1,268,219.      Specification of Letters Patent.      Patented June 4, 1918.

Application filed March 6, 1917. Serial No. 152,696.

*To all whom it may concern:*

Be it known that I, FRED W. COOLEY, a citizen of the United States, residing at Minneapolis, in the county of Hennepin and State of Minnesota, have invented certain new and useful Improvements in Distributing-Spouts; and I do hereby declare the following to be a full, clear, and exact description of the invention, such as will enable others skilled in the art to which it appertains to make and use the same.

My invention relates to improvements in distributing spouts for grain and the like; and, to this end, it consists of the novel devices and combinations of devices hereinafter described and defined in the claims.

In the accompanying drawings, which illustrate the invention, like characters indicate like parts throughout the several views.

Referring to the drawings,

Figure 1 is a view showing the invention, principally in front elevation, with some parts removed and with some parts sectioned;

Fig. 2 is a view, principally in side elevation, with some parts sectioned, with some parts shown in different positions by means of broken lines, and with the upper distributing spout shown in a different position from that shown in Fig. 1;

Fig. 3 is a view, partly in plan and partly in horizontal section taken on the line 3—3 of Fig. 2, with the lower delivery spout shown in different position from that in Fig. 1;

Fig. 4 is a fragmentary detail view, with some parts sectioned on the line 4—4 of Fig. 2, on an enlarged scale;

Fig. 5 is a view, partly in elevation and partly in section of the parts shown in Fig. 4;

Fig. 6 is a fragmentary detail view, partly in side elevation and partly in vertical section taken on the line 6—6 of Fig. 1, on an enlarged scale;

Fig. 7 is a plan view of the spout-supporting bracket shown in Fig. 6;

Fig. 8 is a fragmentary detail view in section taken on the line 8—8 of Fig. 2, on an enlarged scale;

Fig. 9 is a view, principally in side elevation, of the parts shown in Fig. 8, with some parts sectioned on the irregular line 9—9 of Fig. 8;

Fig. 10 is a plan view of the parts shown in Fig. 9; and

Fig. 11 is a detail view in section taken on the line 11—11 of Fig. 3, on an enlarged scale.

The numeral 12 indicates the floor of a grain elevator or other building and the numeral 13 indicates two laterally spaced elevator legs, which extend through said floor and have at their upper ends heads 14. These heads 14 have forwardly offset supply receptacles 15, into which grain or the like is discharged from the elevator 17. Each supply receptacle 15 has a hopper-like open bottom which opens into a lateral box-like extension, also having open hopper-like bottoms, and which extensions are secured to said supply receptacles. These two extensions are laterally spaced, one in front of the other and in front of the elevator legs 13 and their open bottoms are located on a line forwardly projected from a point centrally between said elevator legs. These inner and outer extensions of the supply receptacles are indicated, respectively, by the numerals 18 and 19. Hopper-like discharge throats 20 and 21 are secured, respectively, to the extensions 18 and 19 and form depending portions thereof. A strap 22 rigidly secures the lower end of the discharge throat 20 to the elevator legs 13. Two elbows 23 are secured to the lower end of the throat extension 20 in reverse arrangement and the axis of the discharge end of the lowermost thereof extends vertically.

Upper and lower distributing spouts 24 and 25, respectively, have their receiving ends swiveled, respectively, in respect to the delivery end of the lowermost elbow 23 and the delivery end of the throat extension 21. Secured to the floor 12, is a cup-bearing 26 which is journaled the lower end of a tubular shaft or standard 27, having at its upper end a bifurcated head 28. The prongs of this head 28 embrace the receiving end of the distributing spout 25, are pivoted thereto at 29 and support said spout for vertical raising and lowering movements and horizontal swinging movement. On top of the lowermost elbow 23, is secured a pivot-bearing 30, and it is important to note that this bearing 30 and shaft 27 are both axially alined with the vertically projected axis of the delivery end of the lowermost elbow 23.

Secured on the lower end of the shaft 27 for rotation therewith, is a large grooved wheel 31 around which is passed and secured a cable 32. This cable 32 is provided for oscillating the shaft 27 to horizontally swing the distributing spout 25. The lower distributing spout 25 comprises two telescopically connected sections, the lower of which has secured to its delivery end an elbow 33.

The free end of the distributing spout 25 is supported on a bracket, comprising a radial arm 34 secured to the wheel 31, having at its outer end a segmental strap or holder 35, a bearing 36 in which is journaled an anti-friction roller 37 and a pair of bars 38 which support the outer end of the arm 34. The upper ends of these bars 38 are secured, one to each end of a horizontal rod 39 anchored to the prongs of the head 28 and their lower ends are secured to the ends of the journal for the roller 37. On the under side of the lower section of the distributing spout 25, is secured a flat track section 40, which rests directly on the roller 37 and supports said spout section, with freedom for telescopical movement with the other section thereof. The holder 35 loosely engages the distributing spout 25 and holds the same against lateral movement from the roller 37. The delivery section of the distributing spout 25 is further supported on a long horizontal roller 41 journaled on the rod 39.

Telescopical movement is imparted to the delivery section of the distributing spout 25 by a cable 42, one end of which is attached to an eye formed in the upper end of the track section 40. This cable 42 is extended downward through the shaft 27 and is directed thereto by a guide sheave 43 journaled to the head 28 between the prongs thereof. On leaving the shaft 27, the cable 42 runs under a guide sheave 43' secured to the joist of the floor 12, and from thence, it is extended to a place convenient to the operator. A hook 25', on the lower side and upper end of the lower section of the distributing spout 25, is arranged to engage the roller 41 and limits the extending movement thereof.

When the distributing spout 24 is in its extended position, the elbow 33 thereof swings on the arc of the same circle with a single row of circumferentially spaced funnels or spout openings 44 in the floor 12. The center of the circle, on the arc of which the funnels 44 are located, is at the axis of the swivel of the distributing spout 25.

Journaled on the lower end of the throat extension 21, is a grooved wheel 45 of the same diameter as the wheel 31. An annular bearing flange 46, on the throat extension 21, supports the wheel 45, with freedom for oscillatory movement in a horizontal plane. To permit the wheel 45 to be applied to or removed from the throat extension 21, the same is transversely divided through diametrically opposite spokes thereof and the sections of said wheel are detachably connected by nut-equipped bolts 47. The receiving end of the distributing spout 24 is telescoped onto the throat extension 21, below the wheel 45, and has rigidly secured thereto the vertical flanges of a pair of diametrically opposite angle brackets 48. The horizontal out-turned flanges of these angle brackets 48 directly engage the under faces of two of the spokes of the wheel 45 and are detachably secured thereto by U-bolts 49. These U-bolts 49 connect the distributing spout 24 for common rotation with the wheel 45, but with freedom for vertical swinging movement. The intermediate portion of an indicator actuating cable 50 is attached to and extended over the wheel 45 and by which the distributing spout 24 may be swung horizontally over the distributing spout 25.

It is highly important to note that the swivels for the two distributing spouts 24 and 25 are laterally offset, the one from the other, or, in other words, the swivel for the spout 25 is eccentrically located, with respect to the swivel for the spout 24.

On the outer end of the distributing spout 25, is a down-turned elbow 51 which is extended into the upper end of a two-part flexible spout section 52 and pivoted thereto by nut-equipped bolts 53 at diametrically opposite points. The upper and lower parts of the spout section 52 are also telescoped, the former into the latter, and pivotally connected by a pair of diametrically opposite nut-equipped bolts 53. The two parts of the spout section 52 are made upwardly flaring, so as to loosely fit, the one in the other and onto the elbow 51. The pivot bolts 53 are so arranged as to permit the spout section 52 to swing vertically and radially toward the axis of the swivel of the spout 24. By reference to Fig. 11, it will be noted that the lower end of the flexible spout section 52 is of substantially the same diameter as the bodies of the funnels 44 and freely fits in the flaring top of any one thereof.

Connections are provided for raising and lowering the free end of the delivery spout 24, for the purpose of carrying the delivery end of the flexible spout opening into and out of the funnels 44 and over the spout 24, during the swinging movement of the spout 25. These connections are as follows:—

One end of a cable 54 is attached at 55 to the outer end of the distributing spout 25 and its other or upper end is attached to the free end of a horizontal arm 56 pivoted to a bearing 57 on a frame-work 58 secured to the heads 14. This bearing 57 is located on the extended axis of the swivel for the distributing spout 24. A link 59 has one of its ends attached to the free end of the arm 56 and its other end is attached to the short end of a lever 60, intermediately fulcrumed to the frame-work 58, and it will be noted that the connection between the link 57 and lever 60 is located directly over the bearing 57. To the long end of the lever 60, is attached a cable 61 which extends to a convenient location for the operator.

A radius rod 62, pivoted to the bearing 57, is rigidly secured to the lower part of the flexible spout section 52 and holds the same in an upright position and causes the same to swing on the arc of the same circle with the funnels 44. With the flexible spout section 52 thus held, the same may be brought into registration with any one of the funnels 44.

By pulling on the cable 61, the outer end of the distributing spout 24 may be raised, and then by operating the cable 50, said spout may be swung in either direction and from one side to the other of the distributing spout 24. The operator may, by watching the indicator to which the cable 50 is attached, position the flexible spout section 52 over any one of the funnels 44, and then by releasing the cable 61, bring the same into registration therewith.

To move the distributing spout 25 from one funnel 44 to the other and from one side to the other of the distributing spout 24, the operator pulls on the cable 42 to retract the same. Then by operating the cable 32 and watching the indicator for the distributing spout 25, said spout may be moved onto the radial line of any one of the funnels 44. With the distributing spout thus positioned, its elbow 33 may be brought into registration with the respective funnels 44 by releasing the cable 42 and thereby permit the extending movement of the lower section of said spout, under the action of gravity.

What I claim is:—

1. The combination with supply receptacles, of two delivery spouts connected thereto by offset swivels, one of said spouts being radially adjustable, and means for causing the delivery end of said radially adjustable spout to swing on the arc of the same circle with the delivery end of the other of said spouts.

2. The combination with supply receptacles, of two delivery spouts connected thereto by offset swivels, one of said spouts being radially and vertically adjustable, and means for causing the delivery end of said radially adjustable spout to swing on the arc of the same circle with the delivery end of the other of said spouts and move past the same.

3. The combination with supply receptacles, of two distributing spouts connected thereto by offset swivels, a single row of spout openings arranged on the arc of a circle on which the delivery end of one of said spouts swings, the other of said spouts having a radially adjustable delivery end, and a connection for causing said radially adjustable delivery end to swing on the arc of the spout openings.

4. The combination with supply receptacles, of two distributing spouts connected thereto by offset swivels, a single row of spout openings arranged on the arc of a circle on which the delivery end of one of said spouts swings, the other of said spouts having a radially and vertically adjustable delivery end, a connection for causing said radially and vertically adjustable delivery end to swing on the arc of the spout openings, and a connection for vertically moving said adjustable delivery end to pass the delivery end of the other of said spouts.

5. The combination with several supply receptacles, of a corresponding number of distributing spouts connected to said supply receptacles by swivels that are laterally offset, the one from the other, a common row of spout openings arranged on the arc of a circle, the center of which is located at the axis of one of the spout swivels, one of said spouts having a movable delivery end, and a radius rod pivoted at the center of the arc of said spout openings and connected to the said movable spout end to cause the same to move on the arc of the said spout openings.

6. The combination with two supply receptacles, of upper and lower distributing spouts connected to said supply receptacles by swivels that are laterally offset, the one from the other, a common row of spout openings arranged on the arc of a circle, the center of which is located at the axis of the swivel for said lower spout, said lower spout comprising telescoping sections and having its delivery end arranged to move on the arc of said spout openings, said upper spout having a movable delivery end, and a radius rod pivoted at the center of the arc of said spout openings and secured to the movable end of said upper spout to cause the same to move on the arc of said spout openings.

7. The combination with two supply receptacles, of upper and lower distributing spouts connected to said supply receptacles by swivels that are laterally offset, the one from the other, a common row of spout openings arranged on the arc of a circle, the center of which is located at the axis of the swivel for said lower spout, said lower spout comprising telescoping sections and having its delivery end arranged to move on the arc of said spout openings, said upper spout having a movable delivery end, a radius rod pivoted at the center of the arc of said spout openings and secured to the movable end of said upper spout to cause the same to move on the arc of said spout openings, and independent connections for swinging said spouts, for imparting telescopical movement to the lower spout and for raising and lowering the upper spout.

In testimony whereof I affix my signature in presence of two witnesses.

FRED W. COOLEY.

Witnesses:
CLARA DEMAREST,
MAY A. SMITH.